(12) United States Patent
Ahn et al.

(10) Patent No.: US 11,462,799 B2
(45) Date of Patent: Oct. 4, 2022

(54) BATTERY MODULE HAVING GAS DISCHARGE STRUCTURE

(71) Applicant: LG CHEM, LTD., Seoul (KR)

(72) Inventors: Soo-Jun Ahn, Daejeon (KR); Bum Choi, Daejeon (KR); Jun-Ho Lee, Daejeon (KR); Tae-Gyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 27 days.

(21) Appl. No.: 16/615,650

(22) PCT Filed: Jan. 10, 2019

(86) PCT No.: PCT/KR2019/000414
§ 371 (c)(1),
(2) Date: Nov. 21, 2019

(87) PCT Pub. No.: WO2019/139385
PCT Pub. Date: Jul. 18, 2019

(65) Prior Publication Data
US 2020/0227708 A1 Jul. 16, 2020

(30) Foreign Application Priority Data
Jan. 15, 2018 (KR) .......... 10-2018-0004908

(51) Int. Cl.
*H01M 50/30* (2021.01)
*H01M 50/20* (2021.01)
*H01M 50/50* (2021.01)

(52) U.S. Cl.
CPC .......... *H01M 50/30* (2021.01); *H01M 50/20* (2021.01); *H01M 50/50* (2021.01)

(58) Field of Classification Search
CPC ...... H01M 50/30; H01M 50/50; H01M 50/20; H01M 50/502; H01M 50/35;
(Continued)

(56) References Cited

U.S. PATENT DOCUMENTS

| 6,627,345 B1 | 9/2003 | Zemlok et al. |
| 2008/0182160 A1* | 7/2008 | Kim ...................... H01M 50/30 429/82 |

(Continued)

FOREIGN PATENT DOCUMENTS

| CN | 102473884 A | 5/2012 |
| CN | 103247771 A | 8/2013 |

(Continued)

OTHER PUBLICATIONS

International Search Report issued in corresponding International Patent Application No. PCT/KR2019/000414, dated Apr. 12, 2019.
(Continued)

*Primary Examiner* — Maria Laios
*Assistant Examiner* — Adam J Francis
(74) *Attorney, Agent, or Firm* — Morgan, Lewis & Bockius LLP

(57) ABSTRACT

A battery module includes a plurality of cylindrical battery cells, each having at least two electrode terminals of different polarities at one end portion; an upper case and a lower case including an accommodating portion where a space in which the cylindrical battery cells are inserted and accommodated is formed, a gas discharge path extending in front, back, left, and right directions to externally discharge a gas discharged from the cylindrical battery cells and where an open portion externally exposed is formed, and a gas discharge hole opened such that the gas discharge path is connected to the outside; a cover sheet between the upper case and the lower case to cover the open portion of the gas
(Continued)

discharge path; and a plurality of wire type bus bars to electrically contact and connect the electrode terminals of the cylindrical battery cells to each other.

16 Claims, 11 Drawing Sheets

(58) Field of Classification Search
CPC ............ H01M 50/308; H01M 50/383; H01M 50/213; H01M 50/298; H01M 2200/20; H01M 50/276; H01M 50/289; H01M 50/367; H01M 50/503; H01M 50/507; Y02E 60/10
See application file for complete search history.

(56) References Cited

U.S. PATENT DOCUMENTS

| | | | |
|---|---|---|---|
| 2012/0021260 A1* | 1/2012 | Yasui | H01M 10/6554 429/53 |
| 2013/0196204 A1 | 8/2013 | Song et al. | |
| 2014/0154530 A1 | 6/2014 | Fujiwara et al. | |
| 2014/0178723 A1 | 6/2014 | Tsujioka et al. | |
| 2015/0079449 A1 | 3/2015 | Kim et al. | |
| 2015/0140369 A1 | 5/2015 | Itoi et al. | |
| 2015/0270590 A1 | 9/2015 | Okutani et al. | |
| 2015/0280193 A1* | 10/2015 | Ohshiba | H01M 50/394 429/53 |
| 2016/0141573 A1 | 5/2016 | Aoki et al. | |
| 2017/0047572 A1* | 2/2017 | Biskup | H01M 50/502 |
| 2017/0125756 A1* | 5/2017 | Nietling | H01M 10/653 |
| 2017/0346050 A1 | 11/2017 | Morioka | |
| 2018/0358602 A1* | 12/2018 | Fukushima | H01M 10/482 |
| 2019/0296293 A1* | 9/2019 | Scharner | H01M 50/35 |

FOREIGN PATENT DOCUMENTS

| | | |
|---|---|---|
| CN | 103855342 A | 6/2014 |
| CN | 205231148 U | 5/2016 |
| CN | 107452906 A | 12/2017 |
| EP | 3 249 716 A1 | 11/2017 |
| JP | 2011-70872 A | 4/2011 |
| JP | 5213426 B2 | 6/2013 |
| JP | 2016-81793 A | 5/2016 |
| KR | 10-2011-0118807 A | 11/2011 |
| KR | 10-2014-0128845 A | 11/2014 |
| KR | 10-2016-0041311 A | 4/2016 |
| KR | 10-1629004 B1 | 6/2016 |
| KR | 10-2017-0072000 A | 6/2017 |
| KR | 10-2017-0106933 A | 9/2017 |
| WO | 2013/021573 A1 | 2/2013 |
| WO | 2014/156001 A1 | 10/2014 |

OTHER PUBLICATIONS

European Search Report dated Dec. 15, 2020, issued in corresponding European Patent Application No. 19738602.2.
Office Action dated Oct. 15, 2021, issued in corresponding Chinese Patent Application No. 201980002148.X.

* cited by examiner

BATTERY MODULE HAVING GAS DISCHARGE STRUCTURE

TECHNICAL FIELD

The present disclosure relates to a battery module having a gas discharge structure, and more particularly, to a battery module capable of effectively preventing a secondary explosion of a cylindrical battery cell.

The present application claims priority to Korean Patent Application No. 10-2018-0004908 filed on Jan. 15, 2018 in the Republic of Korea, the disclosures of which are incorporated herein by reference.

BACKGROUND ART

With the rapid increase in demand for portable electronic products, such as notebook computers, video cameras, portable phones, etc., and active development of electric vehicles, energy storage batteries, robots, satellites, etc. in recent years, studies on high performance secondary batteries capable of repetitive charging and discharging are being actively conducted.

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, sealing and accommodating the electrode assembly with an electrolyte solution.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Also, since various combustible materials are embedded in the lithium secondary battery, there is a risk of overheating, explosion, or the like due to over-charging, over-current, and other external physical impact, and thus there is a serious safety drawback. Moreover, the can-type secondary battery consisting of a rigid metal can has a higher risk of explosion.

Accordingly, in a battery module including a plurality of secondary batteries consisting of such a metal can, a configuration, such as a relay, a current sensor, a fuse, or a battery management system (BMS) may be used to safely and efficiently manage the secondary battery.

However, despite such measures, a fire, such as an explosion of battery cells inside the battery module may occur due to an external impact, an abnormal operation of the battery cell, or a control failure by the BMS.

In this case, when one battery cell explodes among all battery cells mounted in the battery module, the heat such as flame generated due to the explosion may transfer to battery cells positioned nearby, thereby facilitating occurrence of a phenomenon in which the battery cells are continuously ignited, and thus a risk may be increased.

In this regard, a technology for increasing the stability of a battery module to solve such issues is required to be developed.

DISCLOSURE

Technical Problem

The present disclosure is designed to solve the problems of the related art, and therefore the present disclosure is directed to providing a battery module capable of effectively preventing a secondary explosion of a cylindrical battery cell.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a plurality of cylindrical battery cells, each having at least two electrode terminals having different polarities formed at one end portion; an upper case including an accommodating portion where a space in which the plurality of cylindrical battery cells are inserted and accommodated is formed, a gas discharge path extending in front, back, left, and right directions to externally discharge a gas discharged from the plurality of cylindrical battery cells and where an open portion exposed downward is formed, and a gas discharge hole opened such that the gas discharge path is connected to the outside; a lower case including the accommodating portion combined to a bottom portion of the upper case and where a space in which the plurality of cylindrical battery cells are inserted and accommodated is formed, the gas discharge path extending in the front, back, left, and right directions to externally discharge the gas discharged from the plurality of cylindrical battery cells and where the open portion exposed upward is formed, and the gas discharge hole opened such that the gas discharge path is connected to the outside; and a cover sheet disposed between the upper case and the lower case to cover the open portion of the gas discharge path; and a plurality of wire type bus bars configured to electrically contact and connect the electrode terminals of the plurality of cylindrical battery cells to each other.

Also, the gas discharge hole may be formed in at least two of a front end, a rear end, a left end, and a right end of each of the upper case and the lower case.

Moreover, a height of the gas discharge path in an up-and-down direction may be at least 5 mm.

Also, the plurality of cylindrical battery cells may be spaced apart from each other by at least 0.1 mm.

In addition, the plurality of cylindrical battery cells may have a zigzag arrangement structure by being arranged in a line in a front-and-back direction and alternately biased in a forward direction or backward direction based on a reference line extending in a left-and-right direction.

Moreover, the gas discharge path may be straightly connected and extended in the front-and-back direction along an arrangement of the plurality of cylindrical battery cells and be connected and extended in zigzag in the front-and-back direction based on the reference line of the left-and-right direction.

Also, the accommodating portion may be adhesively formed to surround an outer surface of the plurality of cylindrical battery cells in a horizontal direction.

Also, a stopper protruding in a direction where the electrode terminals of the plurality of cylindrical battery cells are positioned to support at least one region of an upper surface or a lower surface of each of the plurality of cylindrical battery cells may be formed at the accommodating portion.

Moreover, a partition wall partitioning the plurality of cylindrical battery cells may be formed at the accommodating portion of each of the upper case and the lower case.

Also, a stepped structure having different heights of an outer surface in an up-and-down direction may be formed at the partition wall.

Further, the partition wall may have at least one inclined structure in which a vertical height continuously changes in a direction from one cylindrical battery cell to another cylindrical battery cell.

Also, an upper end portion of the partition wall may have a semicylindrical shape.

Moreover, a fixing groove having a structure recessed in an inward direction such that a part of each of the plurality of wire type bus bars is inserted may be formed in at least one of an upper end and a lower end of the partition wall.

Also, the battery module may further include a plurality of plate type bus bars electrically contacting and connected to the plurality of wire type bus bars and positioned at both sides of each of the upper case and the lower case in a left-and-right direction.

Further, an insertion groove recessed in an upward direction may be formed at each of both side portions of the upper case in the left-and-right direction such that at least one region of the plurality of plate type bus bars is inserted and accommodated therein, and an insertion groove recessed in a downward direction may be formed at each of both side portions of the lower case in the left-and-right direction such that at least one region of the plurality of plate type bus bars is inserted and accommodated therein.

Also, the cover sheet may include a mica material.

Moreover, an uplift structure protruding in an up-and-down direction along the gas discharge path may be formed at each of top and bottom surfaces of the cover sheet such that at least a portion of the uplift structure is inserted into an open portion of the gas discharge path.

In another aspect of the present disclosure, there is provided a battery pack including at least one battery module according to the present disclosure.

In another aspect of the present disclosure, there is provided a device including the battery pack of the present disclosure.

Advantageous Effects

According to an aspect of the present disclosure, in a battery module, since a gas discharge path formed in an upper case and a lower case extends in front, back, left, and right directions, generated heat is prevented from being focused on a particular region as a gas or flame caused by an explosion of a cylindrical battery cell spreads in all directions. Accordingly, since the gas discharge path has a sufficient accommodation value for instantaneously accommodating the gas and flame, a secondary explosion of another cylindrical battery cell adjacent to an ignited cylindrical battery cell may be prevented.

Also, according to such an aspect of the present disclosure, in a battery module, since an accommodating portion of an upper case and a lower case are formed to surround an outer surface of a cylindrical battery cell, an outer surface of another cylindrical battery cell is prevented from directly contacting or being exposed to flame or the like of an ignited cylindrical battery cell, and thus a secondary ignition or explosion of a plurality of cylindrical battery cells may be prevented.

Moreover, according to an aspect of the present disclosure, by forming a gas discharge hole at an end portion of an upper case and a lower case in front, back, left, and right directions, the gas discharge hole is formed closely at any position of an accommodating portion of the upper case and the lower case, and thus a gas, flame, heat, or the like generated in a cylindrical battery cell may be quickly discharged. Accordingly, a risk of secondary explosion may be stably and greatly reduced.

Also, according to an aspect of the present disclosure, by disposing a cover sheet including a mica material between an upper case and a lower case, a short-circuit between a cylindrical battery cell positioned at the top of a battery module and a cylindrical battery cell positioned at the bottom of the battery module may be effectively prevented.

Moreover, according to an aspect of the present disclosure, since a wire type bus bar is capable of electrically connecting a plurality of cylindrical battery cells even via a small amount of materials, manufacturing costs may be reduced. Moreover, compared with a bar type bus bar, the wire type bus bar has small volume, and thus even when the wire type bus bar is positioned in a gas discharge path, an influence of disturbing a flow of discharged gas is small, thereby reducing a risk of secondary explosion or the like caused by a gas or flame.

Also, according to another aspect of the present disclosure, a partition wall formed in an accommodating portion of an upper case and a lower case may prevent movement (flow) of one end portion of a wire type bus bar such that, when the one end portion of the wire type bus bar is disconnected from an electrode terminal of a cylindrical battery cell, the one end portion of the wire type bus bar is prevented from being short-circuited with an electrode terminal of another cylindrical battery cell having a different polarity. Accordingly, the stability of a battery module of the present disclosure may be greatly increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
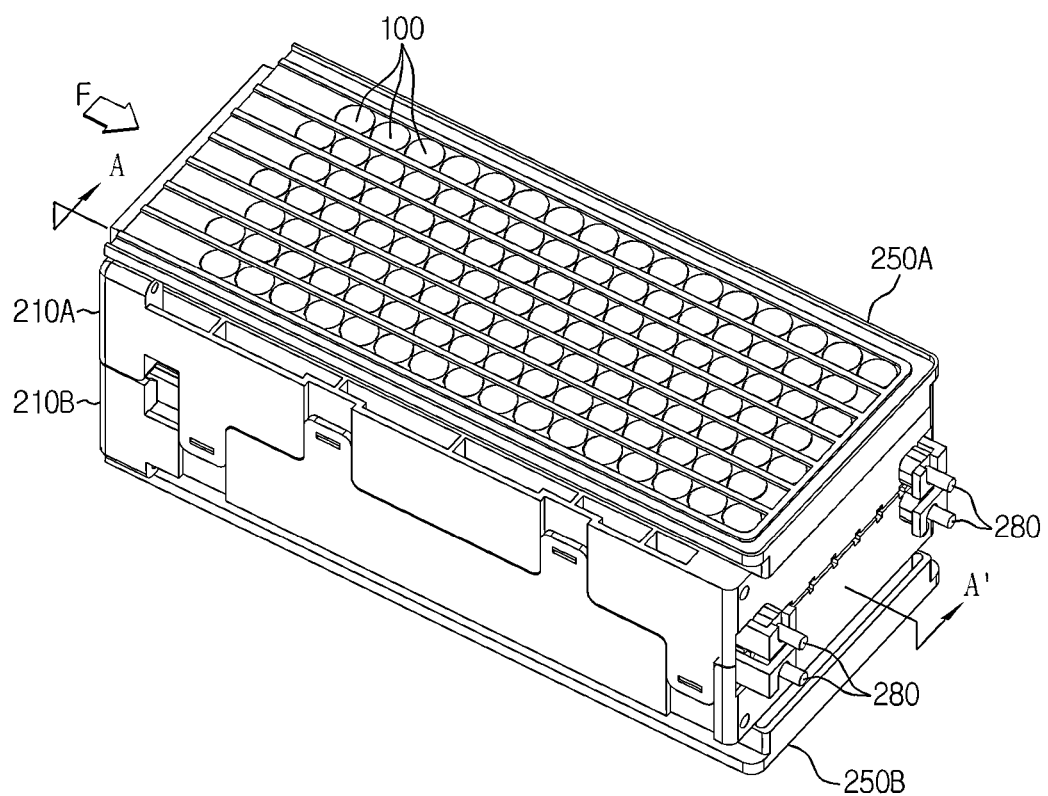
FIG. 1 is a perspective view schematically showing a battery module according to an embodiment of the present disclosure.
Figure 2:
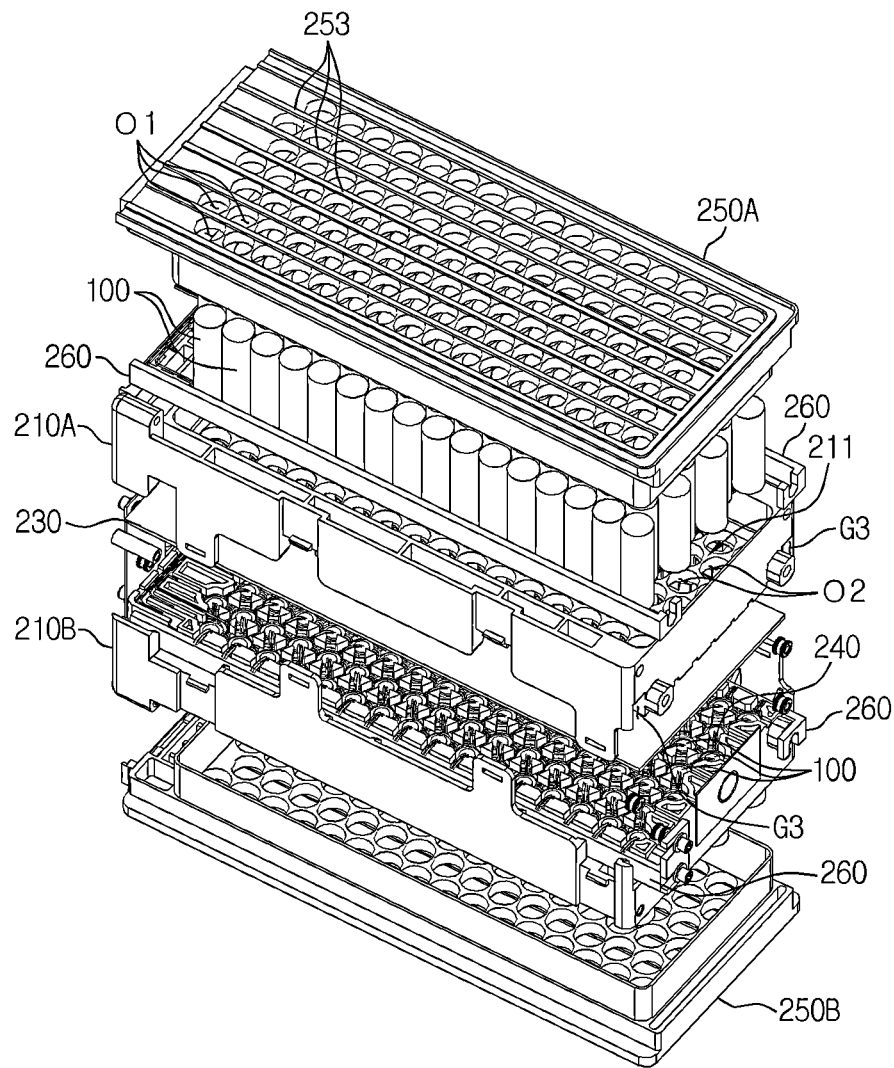
FIG. 2 is an exploded perspective view showing several isolated components with respect to a battery module according to an embodiment of the present disclosure.

FIG. 1 is a perspective view schematically showing a battery module according to an embodiment of the present disclosure. FIG. 2 is an exploded perspective view showing several isolated components with respect to a battery module according to an embodiment of the present disclosure. Also, FIG. 3 is a partial cross-sectional view schematically showing a partial internal structure of a cylindrical battery cell that is a partial component with respect to a battery module according to an embodiment of the present disclosure.

Figure 3:
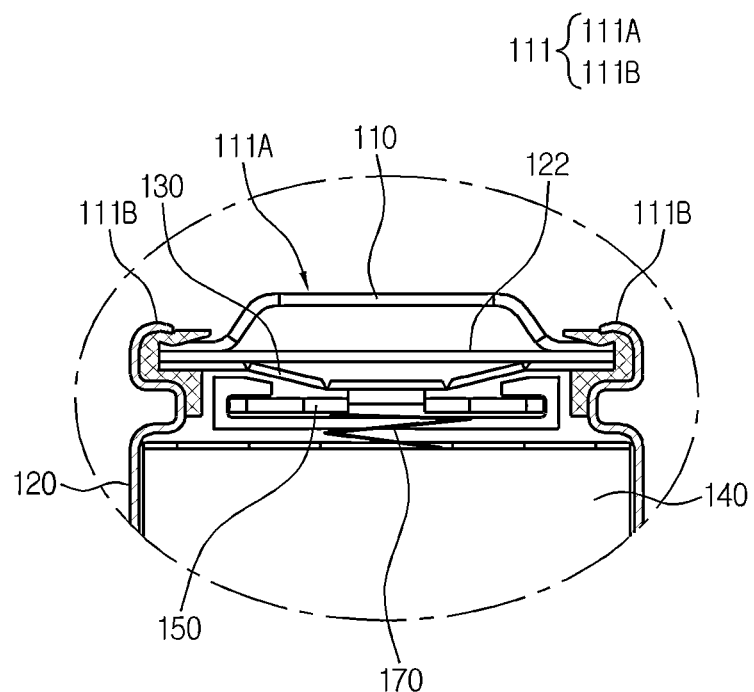
FIG. 3 is a partial cross-sectional view schematically showing a partial internal structure of a cylindrical battery cell that is a partial component with respect to a battery module according to an embodiment of the present disclosure.

Referring to FIGS. 1 through 3, a battery module 200 according to an embodiment of the present disclosure may include a plurality of cylindrical battery cells 100, an upper case 210A, a lower case 210B, a cover sheet 230, and a plurality of wire type bus bars 240.

Here, the cylindrical battery cell 100 may include a cylindrical battery can 120 and an electrode assembly 140 accommodated inside the battery can 120.

Here, the battery can 120 may include a material having high electric conductivity, and for example, the battery can 120 may include an aluminum, steel, or copper material. Also, at least two electrode terminals 111 may be formed at the top of the battery can 120.

In particular, the electrode terminal 111 may include a first electrode terminal 111A and a second electrode terminal 111B having different electric polarities. Also, when viewed from a direction indicated by an arrow F (shown in FIG. 1), the first electrode terminal 111A may be formed at a circular top portion at the top of the battery can 120. Also, the second electrode terminal 111B may be formed on a circular outer peripheral portion of the battery can 120. In other words, the cylindrical battery cell 100 may include the at least two electrode terminals 111 having different polarities at one end portion thereof.

Meanwhile, unless specifically stated, top, bottom, front, back, left, and right directions in the present specification are based on the direction indicated by the arrow F.

Moreover, the electrode assembly 140 may have a structure in which a positive electrode and a negative electrode are wound in a jelly-roll shape with a separator therebetween. A positive electrode tab 170 is attached to the positive electrode (not shown) to contact the first electrode terminal 111A at the top of the battery can 120. A negative electrode tab is attached to the negative electrode (not shown) to contact the second electrode terminal 111B at the bottom of the battery can 120.

Referring back to FIG. 3, in the cylindrical battery cell 100, a top cap 110 is configured to form the electrode terminal 111 to protrude and such that at least a portion perforates when an internal gas reaches particular pressure or higher.

Also, the cylindrical battery cell 100 may include, at the bottom, a safety element 122 (for example, a positive temperature coefficient (PTC) element, a transparent conducting oxide (TCO), or the like) blocking a current by having a large battery resistance when a battery cell internal temperature is high. Also, the cylindrical battery cell 100 may include a safety vent 130 that has a downward protruding shape in a normal state but protrudes and ruptures when the battery cell internal temperature increases, thereby discharging a gas.

Moreover, the cylindrical battery cell 100 may include a current interrupt device (CID) 150 whose one top side region is combined to the safety vent 130 and one bottom side region is connected to a positive electrode of the electrode assembly 140.

However, the battery module 200 according to the present disclosure may employ various cylindrical battery cells well-known at the time of application of the present disclosure, in addition to the cylindrical battery cell 100 described above.

Figure 4:
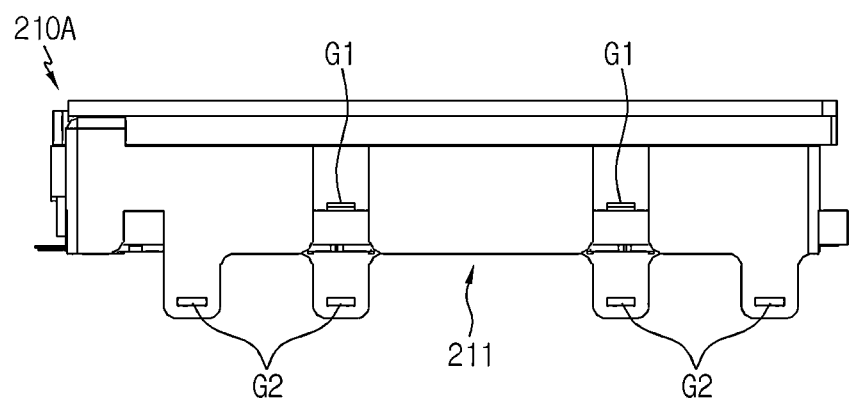
FIG. 4 is a side view schematically showing an upper case that is a partial component with respect to a battery module according to an embodiment of the present disclosure.

FIG. 4 is a side view schematically showing an upper case that is a partial component with respect to a battery module according to an embodiment of the present disclosure. Also, FIG. 5 is a bottom view schematically showing upper components with respect to a battery module according to an embodiment of the present disclosure.

Figure 5:
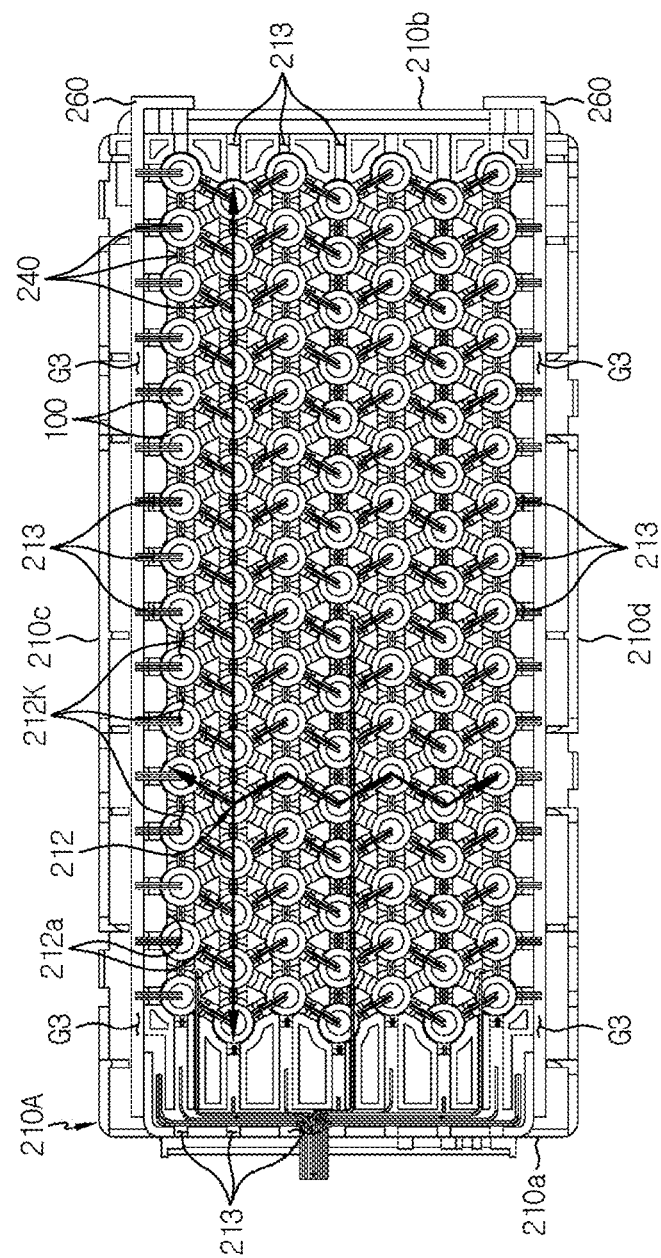
FIG. 5 is a bottom view schematically showing upper components with respect to a battery module according to an embodiment of the present disclosure.

Referring to FIGS. 4 and 5 together with FIGS. 1 and 2, the upper case 210A may include an accommodating portion 211 where a space in which the cylindrical battery cell 100 is inserted and accommodated is formed. Also, the upper case 210A may include an electric insulating material. For example, the electric insulating material may be a plastic material.

In particular, the accommodating portion 211 may include a cylindrical accommodating space in which the cylindrical battery cell 100 may be accommodated. Also, the cylindrical battery cell 100 may be accommodated inside the upper case 210A by being inserted into a circular opening O2 of the accommodating portion 211.

Also, the accommodating portion 211 may be adhesively formed to surround an outer surface of the cylindrical battery cell 100 in a horizontal direction. In other words, the accommodating portion 211 may have an accommodating space adhered to the outer surface of the cylindrical battery cell 100 such that a particular material, flame, or the like is not introduced therein.

Here, the first electrode terminal 111A and the second electrode terminal 111B are positioned at a bottom portion of the cylindrical battery cell 100. In other words, the cylindrical battery cell 100 may be inserted into the accommodating portion 211 of the upper case 210A upside down.

As such, according to such a configuration of the present disclosure, as in a result of Experiment Example 2 below, by forming the accommodating portion 211 of the upper case 210A to surround the outer surface of the cylindrical battery cell 100, the other cylindrical battery cell 100 is prevented from directly contacting or being exposed to flame or the like of the ignited cylindrical battery cell 100 inside the battery module 200, and thus a secondary ignition or explosion of the cylindrical battery cell 100 may be prevented.

Also, the plurality of cylindrical battery cells 100 may be accommodated in the accommodating portion 211 while being spaced apart from each other by, for example, at least 0.1 mm. However, the present disclosure is not necessarily limited to such a numerical value, and the numerical value is only an example.

As such, according to such a configuration of the present disclosure, as in an experiment result of Experiment Example 1 below, by positioning the plurality of cylindrical battery cells 100 accommodated in the battery module 200 according to an embodiment of the present disclosure to be spaced apart from each other by 0.1 mm or more, an amount of transferred heat is low when one cylindrical battery cell 100 is ignited, and thus a chain ignition of the adjacent cylindrical battery cells 100 may be prevented. However, when the plurality of cylindrical battery cells 100 are spaced apart from each other by less than 0.1 mm, when one cylindrical battery cell 100 is ignited, a chain ignition of the adjacent cylindrical battery cells 100 is highly likely to occur.

Also, a gas discharge path 212 extending in front, back, left, and right directions to externally discharge a gas discharged from the cylindrical battery cell 100 may be formed at the upper case 210A.

Thus, according to such a configuration of the present disclosure, by forming the gas discharge path 212 to extend in the front, back, left, and right directions, generated heat may be prevented from being focused on a particular region as a gas or flame caused by an explosion of the cylindrical battery cell 100 spreads in all directions. Also, since the gas discharge path 212 has a sufficient accommodation value for instantaneously accommodating the gas and flame, a secondary explosion of the other cylindrical battery cell 100 adjacent to the ignited cylindrical battery cell 100 may be prevented.

Figure 9:
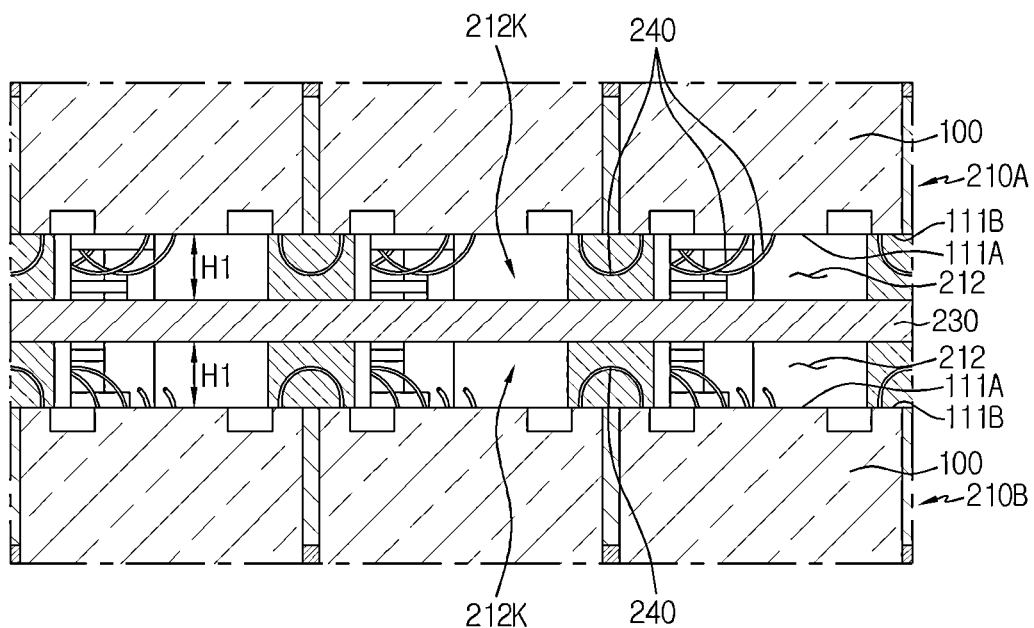
FIG. 9 is a partial cross-sectional view schematically showing one region of a battery module taken along a line A-A' of FIG. 1.

Also, a height H1 of FIG. 9 of the gas discharge path 212 in the up-and-down direction may be equal to or greater than 5 mm. However, when the height H1 of FIG. 9 of the gas discharge path 212 in the up-and-down direction is smaller than 5 mm, a chain ignition of the plurality of cylindrical battery cells 100 is likely to occur, and thus there is a risk.

As such, according to such a configuration of the present disclosure, as in a result of Experiment Example 3 below, when the height H1 of FIG. 9 of the gas discharge path 212 in the up-and-down direction is set to be equal to or greater than 5 mm, an effect of preventing a chain ignition of the concentrated cylindrical battery cells 100 may be achieved.

Moreover, the gas discharge path 212 may be formed at a bottom portion of the upper case 210A, which is adjacent to the first electrode terminal 111A formed at the bottom of the cylindrical battery cell 100. Here, the safety vent 130 of FIG. 3 may be formed at the bottom portion of the cylindrical battery cell 100 where the first electrode terminal 111A is formed.

In addition, an open portion 212K exposed downward may be formed at the gas discharge path 212 of the upper case 210A. In other words, a side wall 212*a* capable of guiding movement of a gas may be formed at the gas discharge path 212. The open portion 212K opened downward may be formed at the bottom of the side wall 212*a*.

Further, a gas discharge hole 213 opened such that the gas discharge path 212 is connected to the outside may be formed at the upper case 210A. In particular, the gas discharge hole 213 may be formed in at least two of a front end 210*a*, a rear end 210*b*, a left end 210*c*, and a right end 210*d* of the upper case 210A, when viewed from the direction indicated by the arrow F of FIG. 1.

For example, as shown in FIG. 5, the plurality of gas discharge holes 213 may be formed in each of the front end 210*a*, the rear end 210*b*, the left end 210*c*, and the right end 210*d* of the upper case 210A.

As such, according to such a configuration of the present disclosure, by forming the gas discharge hole 213 at end portions of the upper case 210A in the front, back, left, and right directions, a gas, flame, heat, or the like generated in the cylindrical battery cell 100 may be quickly discharged, and since the gas discharge hole 213 is formed close to any position of the accommodating portion 211 of the upper case 210A, a risk of secondary explosion may be stably and greatly reduced.

Figure 6:
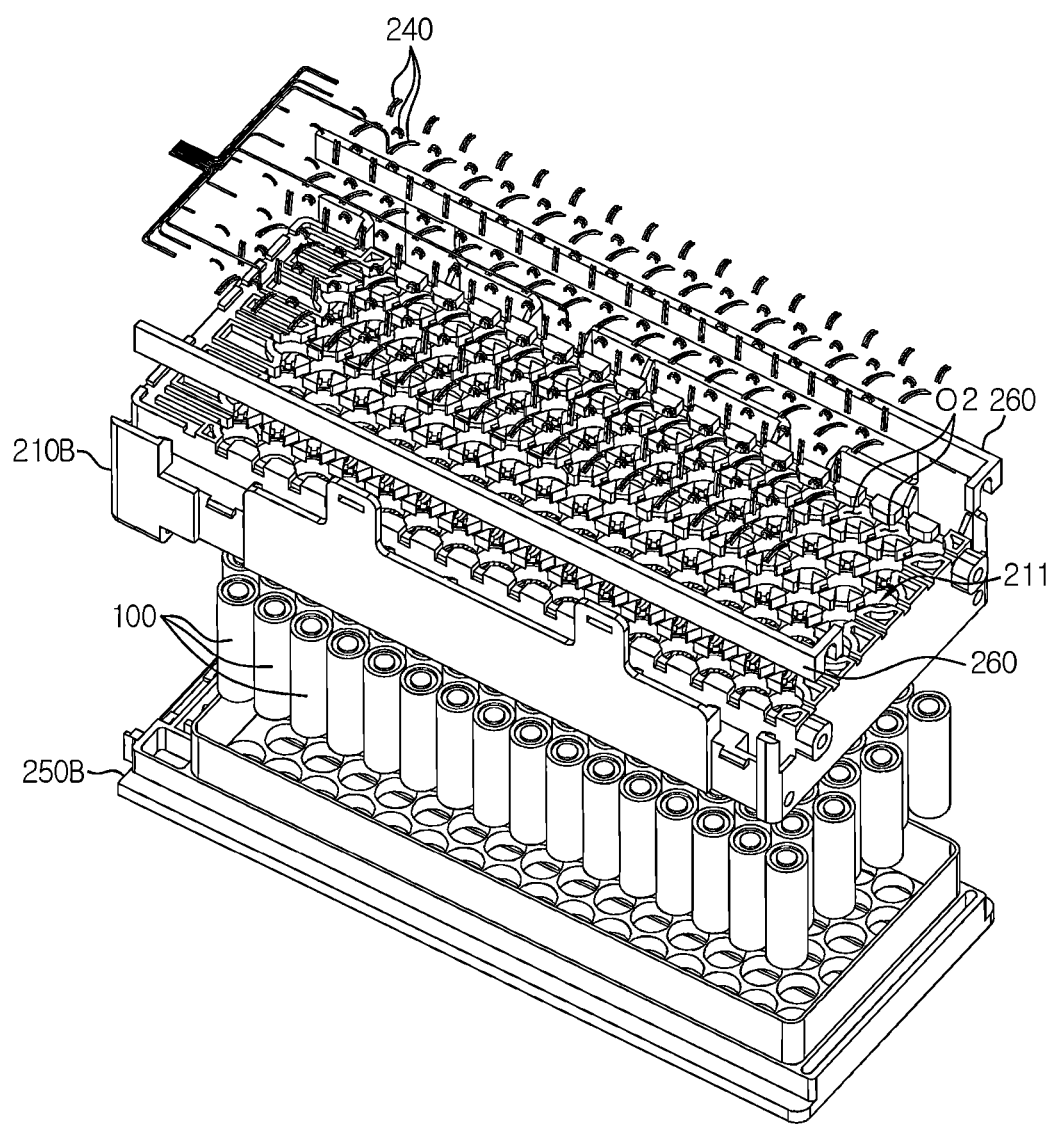
FIG. 6 is an exploded perspective view schematically showing lower components with respect to a battery module according to an embodiment of the present disclosure.

FIG. 6 is an exploded perspective view schematically showing lower components with respect to a battery module according to an embodiment of the present disclosure. Also, FIG. 7 is a side view schematically showing a lower case that is a partial component with respect to a battery module according to an embodiment of the present disclosure.

Figure 7:
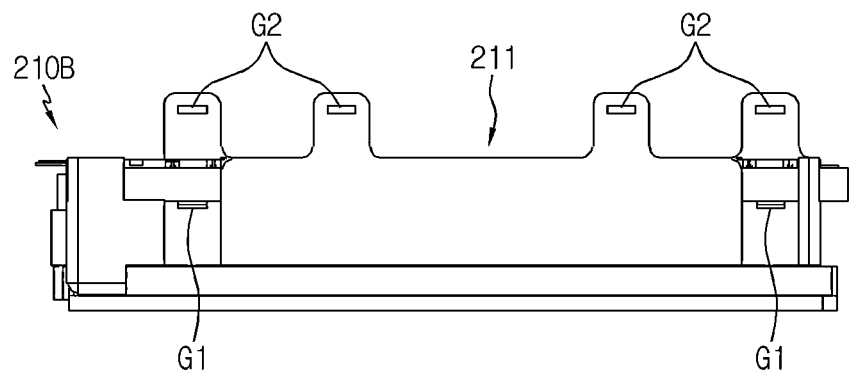
FIG. 7 is a side view schematically showing a lower case that is a partial component with respect to a battery module according to an embodiment of the present disclosure.

Referring to FIGS. 6 and 7 together with FIGS. 2 and 4, the lower case 210B may have a coupling structure combined to the bottom of the upper case 210A. For example, the coupling structure may be a coupling structure in which a hook protrusion G1 and a coupling groove G2 are combined.

In particular, the hook protrusion G1 and the coupling groove G2 may be formed at each of the upper case 210A and the lower case 210B. For example, as shown in FIGS. 4 and 7, the hook protrusion G1 of the upper case 210A may be formed at corresponding position to be combined with the coupling groove G2 of the lower case 210B. Also, the hook protrusion G1 of the lower case 210B may be formed at a corresponding position to be combined with the coupling groove G2 of the upper case 210A.

Moreover, the lower case 210B may include the accommodating portion 211 where a space in which the cylindrical battery cell 100 is inserted and accommodated is formed. Also, the lower case 210B may include an electric insulating material. For example, the electric insulating material may be a plastic material.

In particular, the accommodating portion 211 may include a cylindrical accommodating space in which the cylindrical battery cell 100 may be accommodated. Also, the cylindrical battery cell 100 may be accommodated inside the lower case 210B by being inserted into the circular opening O2 of the accommodating portion 211.

Here, the first electrode terminal 111A and the second electrode terminal 111B are positioned at the top portion of the cylindrical battery cell 100. In other words, the cylindrical battery cell 100 may be inserted into the accommodating portion 211 of the lower case 210B while the first electrode terminal 111A and the second electrode terminal 111B are positioned at the top portion.

Also, the plurality of cylindrical battery cells 100 may be accommodated in the accommodating portion 211 while an outer surface of one cylindrical battery cell 100 and an outer surface of the other cylindrical battery cell 100 are spaced apart from each other by at least 0.1 mm.

As such, according to such a configuration of the present disclosure, as in the experiment result of Experiment Example 1, since the plurality of cylindrical battery cells 100 accommodated in the battery module 200 are spaced apart from each other by 0.1 mm or more, an amount of transferred heat is low when one cylindrical battery cell 100 is ignited, and thus a chain ignition of the adjacent cylindrical battery cell 100 may be prevented.

Also, the accommodating portion 211 may be adhesively formed to surround the outer surface of the cylindrical battery cell 100 in the horizontal direction. In other words, the accommodating portion 211 may have an accommodating space adhered to the outer surface of the cylindrical battery cell 100 such that a particular material, flame, or the like is not introduced to the outer surface.

As such, according to such a configuration of the present disclosure, by forming the accommodating portion 211 of the lower case 210B to surround the outer surface of the cylindrical battery cell 100, the other cylindrical battery cell 100 is prevented from directly contacting or being exposed to flame or the like of the ignited cylindrical battery cell 100 inside the battery module 200, and thus a secondary ignition or explosion of the cylindrical battery cell 100 may be prevented.

Figure 8:
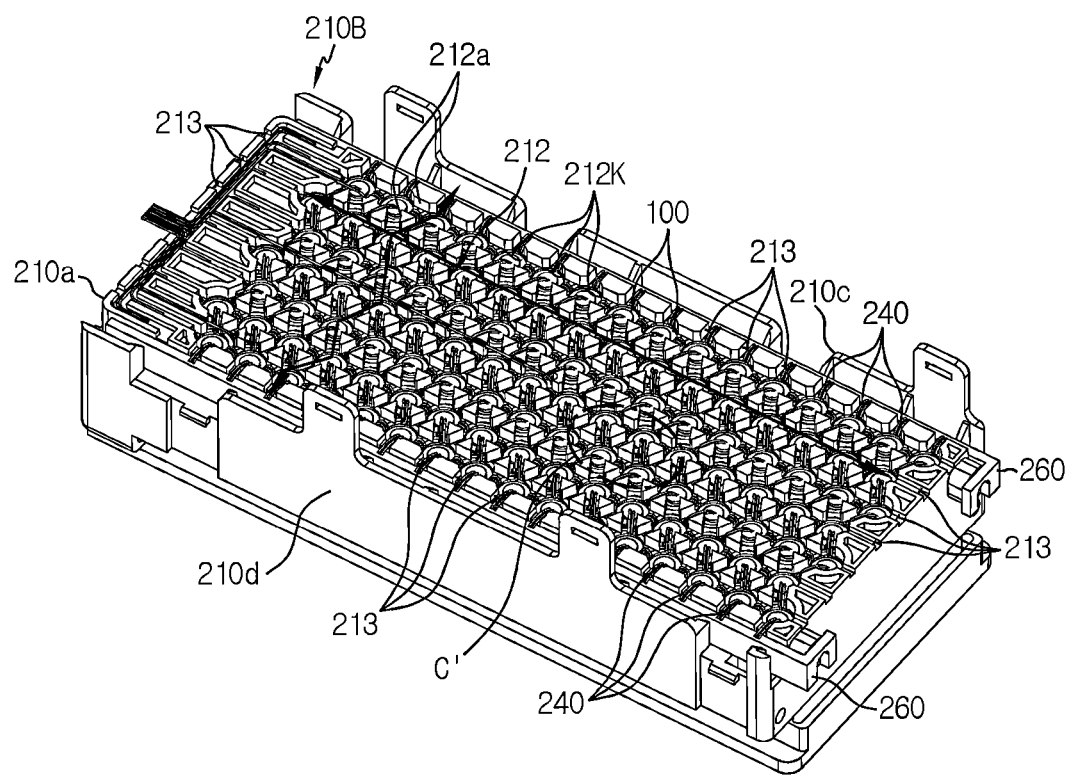
FIG. 8 is a perspective view schematically showing partial components with respect to a battery module according to an embodiment of the present disclosure.

FIG. 8 is a perspective view schematically showing partial components with respect to a battery module according to an embodiment of the present disclosure.

Referring to FIG. 8 together with FIG. 6, the gas discharge path 212 extending in the front, back, left, and right directions to externally discharge the gas discharged from the cylindrical battery cell 100 may be formed at the lower case 210B.

As such, according to such a configuration of the present disclosure, by forming the gas discharge path 212 to extend in the front, back, left, and right directions, generated heat may be prevented from being focused on a particular region as a gas or flame caused by an explosion of the cylindrical battery cell 100 spreads in all directions. Also, since the gas discharge path 212 has a sufficient accommodation value for instantaneously accommodating the gas and flame, a secondary explosion of the other cylindrical battery cell 100 adjacent to the ignited cylindrical battery cell 100 may be prevented.

Also, a height H1 of FIG. 9 of the gas discharge path 212 in the up-and-down direction may be equal to or greater than 5 mm. However, when the height H1 of FIG. 9 of the gas discharge path 212 in the up-and-down direction is smaller than 5 mm, a chain ignition of the plurality of cylindrical battery cells 100 is likely to occur, and thus there is a risk.

As such, according to such a configuration of the present disclosure, as in the result of Experiment Example 3 below, when the height H1 of FIG. 9 of the gas discharge path 212 in the up-and-down direction is set to be equal to or greater than 5 mm, an effect of preventing a chain ignition of the concentrated cylindrical battery cells 100 may be achieved.

Moreover, the gas discharge path 212 may be formed at a top portion of the lower case 210B, which is adjacent to the first electrode terminal 111A formed at the top of the cylindrical battery cell 100. Here, the safety vent 130 of FIG. 3 may be formed at the top portion of the cylindrical battery cell 100 where the first electrode terminal 111A is formed.

In addition, the open portion 212K exposed upward may be formed at the gas discharge path 212 of the lower case 210B. In other words, the side wall 212a capable of guiding movement of a gas may be formed at the gas discharge path 212. The open portion 212K opened upward may be formed at the top of the side wall 212a.

Further, the gas discharge hole 213 opened may be formed at the lower case 210B such that the gas discharge path 212 is connected to the outside. In particular, the gas discharge hole 213 may be formed in at least two of the front end 210a, the rear end 210b, the left end 210c, and the right end 210d of the lower case 210B. For example, as shown in FIG. 8, the plurality of gas discharge holes 213 may be formed in each of the front end 210a, the rear end 210b, the left end 210c, and the right end 210d of the lower case 210B.

As such, according to such a configuration of the present disclosure, in the lower case 210B, by forming the gas discharge hole 213 in the front, back, left, and right directions, a gas, flame, heat, or the like generated in the cylindrical battery cell 100 may be quickly discharged, and since the gas discharge hole 213 is formed close to any position of the accommodating portion 211 of the lower case 210B, a risk of secondary explosion may be stably and greatly reduced.

FIG. 9 is a partial cross-sectional view schematically showing one region of a battery module taken along a line A-A' of FIG. 1.

Referring to FIG. 9 together with FIGS. 2 and 8 again, the cover sheet 230 may be disposed between the upper case 210A and the lower case 210B to cover the open portion 212K of the gas discharge path 212 of each of the upper case 210A and the lower case 210B.

Also, the cover sheet 230 may include a material having high fire resistance and electric insulation. For example, the cover sheet 230 may include a mica material and/or ceramic material. In particular, the cover sheet 230 may have a form in which a mica layer is formed on both surfaces of a ceramic sheet.

As such, according to such a configuration of the present disclosure, by disposing the cover sheet 230 having electric insulation between the upper case 210A and the lower case 210B, short-circuit between the cylindrical battery cell 100 located at the upper case 210A of the battery module 200 and the cylindrical battery cell 100 located at the lower case 210B may be effectively prevented.

Moreover, the cover sheet 230 including the mica material has excellent heat resistance, and thus may effectively reduce an effect of flame on the other adjacent cylindrical battery cell 100 caused by an explosion of the cylindrical battery cell 100.

Referring to FIG. 9 together with FIGS. 5 and 8 again, the wire type bus bar 240 may be configured to electrically contact and connect the electrode terminals 111 of the plurality of cylindrical battery cells 100 to each other, the plurality of cylindrical battery cells 100 being mounted on each of the upper case 210A and the lower case 210B.

In particular, the wire type bus bar 240 may include an electric conductive material. For example, the electric conductive material may be copper, aluminum, nickel, or the like. Also, the wire type bus bar 240 may contact and be combined to the outer surface of the first electrode terminal 111A of the cylindrical battery cell 100 and the outer surface of the second electrode terminal 111B of the other cylindrical battery cell 100.

Alternatively, the wire type bus bar 240 may contact and be combined to the outer surface of the first electrode terminal 111A of the cylindrical battery cell 100 and the outer surface of the first electrode terminal 111A of the other cylindrical battery cell 100.

Alternatively, the wire type bus bar 240 may contact and be combined to the outer surface of the second electrode terminal 111B of the cylindrical battery cell 100 and the outer surface of the second electrode terminal 111B of the other cylindrical battery cell 100.

In other words, the wire type bus bar 240 may be configured to provide electrically serial or parallel connection between the plurality of cylindrical battery cells 100.

Also, an end portion of the wire type bus bar 240 contacting the outer surface of the electrode terminal 111 may have a plate shape adhered to the outer surface of the electrode terminal 111.

As such, according to such a configuration of the present disclosure, when the end portion of the wire type bus bar 240 is configured in the plate shape adhered to the electrode terminal 111, a contact area with the electrode terminal 111 may be increased and adhesive force is also increased, and thus the durability of a connection structure may be effectively increased.

Also, the wire type bus bar 240 may be positioned inside the gas discharge path 212. In other words, an electric connection structure of the plurality of cylindrical battery cells 100 through the plurality of wire type bus bars 240 may be formed inside the gas discharge path 212.

For example, as shown in FIG. 5, the plurality of wire type bus bars 240 formed at the upper case 210A may contact and connect the electrode terminal 111 of the cylindrical battery cell 100 and the electrode terminal 111 of the other cylindrical battery cell 100. In other words, in the two cylindrical battery cells 100 arranged in the front-and-back direction, the second electrode terminals 111B thereof may be electrically connected through the wire type bus bar 240 to each other.

Also, in the plurality of cylindrical battery cells 100 arranged in the left-and-right direction, the first electrode terminal 111A and the second electrode terminal 111B may be electrically connected to each other through the wire type bus bar 240.

For example, as shown in FIG. 8, the plurality of wire type bus bars 240 formed at the lower case 210B may contact and connect the electrode terminal 111 of the one cylindrical battery cell 100 and the electrode terminal 111 of the other cylindrical battery cell 100. In other words, in the two cylindrical battery cells 100 arranged in the front-and-back direction, the second electrode terminals 111B thereof may be electrically connected through the wire type bus bar 240. Also, in the plurality of cylindrical battery cells 100 arranged in the left-and-right direction, the first electrode terminal 111A and the second electrode terminal 111B may be electrically connected to each other through the wire type bus bar 240.

As such, according to such a configuration of the present disclosure, the wire type bus bar 240 may electrically connect the plurality of cylindrical battery cells 100 even with a small amount of materials, and thus manufacturing costs may be reduced. Moreover, compared with a bar type bus bar, the wire type bus bar has small volume, and thus even when the wire type bus bar 240 is positioned in the gas discharge path 212, an influence of disturbing a flow of discharged gas is small, thereby reducing a risk of secondary explosion or the like caused by a gas or flame.

Also, the number of wire type bus bars 240 providing the electric connection between the two electrode terminals 111 may be set in consideration of a cross-sectional area of the wire type bus bar 240 and a required suitable level of resistance value.

In other words, when the area and the number of the wire type bus bars 240 providing the electric connection between the two electrode terminals 111 are increased, the resistance of electric flow between the two cylindrical battery cells 100 may be lowered. On the other hand, when the wire type bus bar 240 has high resistance, a heat value is high, thereby increasing the internal temperature of the battery module 200, and thus the durability of the battery module 200 may be reduced or a fire may break out.

Also, when there are two or more wire type bus bars 240 providing the electric connection between the two electrode terminals 111, even when one wire type bus bar 240 is disconnected, the remaining wire type bus bar 240 provides the electric connection, and thus damage caused by the disconnection may be reduced.

Referring back to FIGS. 5 and 8, the plurality of cylindrical battery cells 100 accommodated in the upper case 210A and the lower case 210B may have a zigzag arrangement structure by being arranged in a line in the front-and-back direction and alternately biased in a forward direction or backward direction based on a reference line extending in the left-and-right direction.

As such, according to such a configuration of the present disclosure, when the plurality of cylindrical battery cells 100 have the zigzag arrangement structure in the left-and-right direction, an empty space formed between the plurality of cylindrical battery cells 100 may be reduced, and accordingly, the more number of battery cells may be accommodated in the same volume, thereby effectively increasing the energy density of the battery module 200.

Also, the gas discharge path 212 may be set according to an arrangement structure of the plurality of cylindrical battery cells 100. In particular, the gas discharge path 212 may be straightly connected and extended in the front-and-back direction along an arrangement of the plurality of cylindrical battery cells 100, and connected and extended in zigzag in the front-and-back direction based on the reference line of the left-and-right direction.

As such, according to such a configuration of the present disclosure, by connecting and extending the gas discharge path 212 in zigzag, flame generated in the cylindrical battery cell 100 may be interfered by the side wall 212a of the gas discharge path 212, and thus an influence of the flame on the left and right cylindrical battery cells 100 adjacent to the ignited cylindrical battery cell 100 may be reduced.

Figure 10:
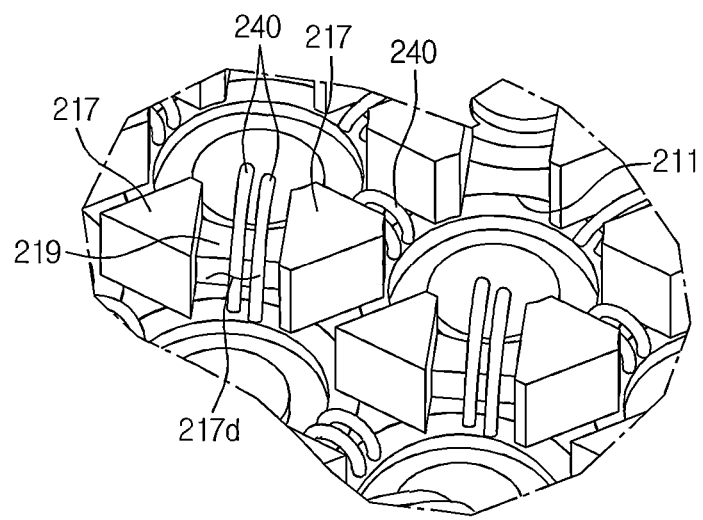
FIG. 10 is a partial enlarged view schematically showing a region C' of FIG. 8.

FIG. 10 is a partial enlarged view schematically showing a region C' of FIG. 8. Referring to FIGS. 8 and 10 together with FIG. 2, a stopper 217 protruding in a direction where the electrode terminal 111 of the cylindrical battery cell 100 is positioned may be formed at the accommodating portion 211 of the upper case 210A and the lower case 210B. In particular, the stopper 217 may be configured to support at least one region of the upper surface or lower surface of the cylindrical battery cell 100. In other words, the stopper 217 may be formed to support one end portion of the cylindrical battery cell 100 where the first electrode terminal 111A and the second electrode terminal 111B are formed.

For example, the stopper 217 may be configured to support the lower surface of the cylindrical battery cell 100 at the accommodating portion 211 formed at the upper case 210A. Also, the stopper 217 may be configured to support the upper surface of the cylindrical battery cell 100 at the accommodating portion 211 formed at the lower case 210B.

As shown in FIG. 10, the plurality of stoppers 217 protruding to support one region of the second electrode terminal 111B of the cylindrical battery cell 100 may be formed at the accommodating portion 211 of the lower case 210B.

As such, according to such a configuration of the present disclosure, the plurality of stoppers 217 formed at the accommodating portion 211 may effectively prevent the cylindrical battery cell 100 from being displaced from the accommodating portion 211.

Also, a space 217d to which the wire type bus bar 240 may extend may be formed between the plurality of stoppers 217. In other words, the space 217d may be formed between a side surface of one stopper 217 in the horizontal direction and a side surface of the other stopper 217 in the horizontal direction.

As such, according to such a configuration of the present disclosure, even when the connection structure between the plurality of electrode terminals 111 of the wire type bus bar 240 is disconnected, the plurality of stoppers 217 may block the wire type bus bar 240 from being displaced from the space 217d. Accordingly, the durability of the battery module 200 may be effectively increased.

Referring to FIG. 10 together with FIG. 2 again, a partition wall 219 partitioning the plurality of cylindrical battery cells 100 may be formed at the accommodating portion 211 of each of the upper case 210A and the lower case 210B. Here, the partition wall 219 may protrude in an upward direction or a downward direction. Also, the partition wall 219 may have a stepped structure in which an outer surface of the partition wall 219 and an outer surface of the accommodating portion 211 have different heights in the top-and-bottom direction.

For example, as shown in FIG. 10, the partition wall 219 may be formed between the two stoppers 217 formed at the accommodating portion 211 of the lower case 210B. Also, the partition wall 219 may have a quadrangular block shape protruding in the upward direction to have a stepped structure in which the height in the top-and-bottom direction is different from the outer surface of the accommodating portion 211.

As such, according to such a configuration of the present disclosure, the partition wall 219 may block movement of one end portion of the wire type bus bar 240 to prevent the one end portion of the wire type bus bar 240 from being short-circuited with the electrode terminal 111 of the other cylindrical battery cell 100 of the different polarity, when the one end portion of the wire type bus bar 240 is disconnected from the electrode terminal 111 of the cylindrical battery cell 100. Accordingly, the safety of the battery module 200 of the present disclosure may be greatly increased.

Figure 11:
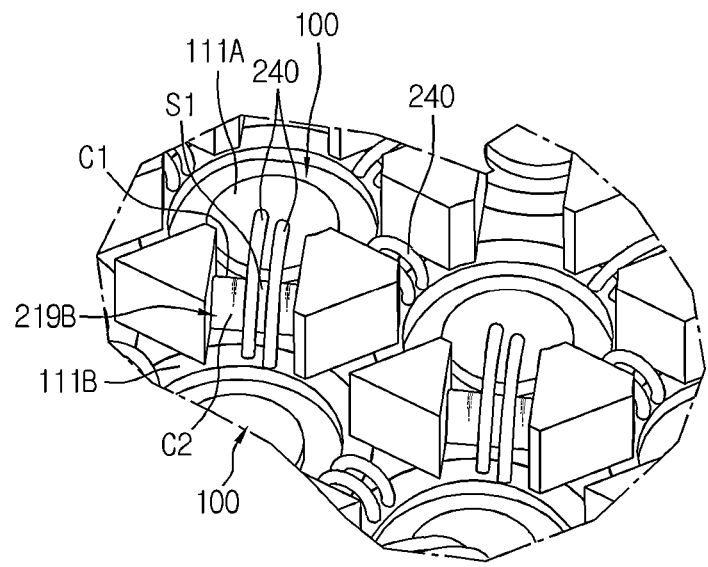
FIG. 11 is a partial enlarged view schematically showing partial components with respect to a battery module according to another embodiment of the present disclosure.

FIG. 11 is a partial enlarged view schematically showing partial components with respect to a battery module according to another embodiment of the present disclosure.

Referring to FIG. 11, at least one inclined structure C1 in which a vertical height continuously changes in a direction from one cylindrical battery cell 100 to the other cylindrical battery cell 100 may be formed at a partition wall 219B.

In particular, the partition wall 219B may have the inclined structure C1 in which the height continuously increases and an inclined structure C2 in which the height continuously decreases in the direction from one cylindrical battery cell 100 to the other cylindrical battery cell 100. In other words, the partition wall 219B may have the inclined structure C1 and the inclined structure C2, and the cross section of the partition wall 219B in the protruding direction of the partition wall 219B may have a triangular shape.

Also, an upper portion S1 of the partition wall 219B may have a semicylindrical shape.

For example, as shown in FIG. 11, the partition wall 219B may have the two inclined structures C1 and C2 in which the height continuously changes in the direction from the one cylindrical battery cell 100 to the other cylindrical battery cell 100, and the top portion S1 of the partition wall 219B may have a semicylindrical shape.

As such, according to such a configuration of the present disclosure, by forming the partition wall 219B to support the bottom of the wire type bus bar 240, the partition wall 219B may guide the wire type bus bar 240 to be suitably arranged between the electrode terminal 111 of the cylindrical battery cell 100 and the electrode terminal 111 of the cylindrical battery cell 100, and thus an electric connection process of the plurality of cylindrical battery cells 100 may be facilitated and a manufacturing time may be reduced.

Figure 12:
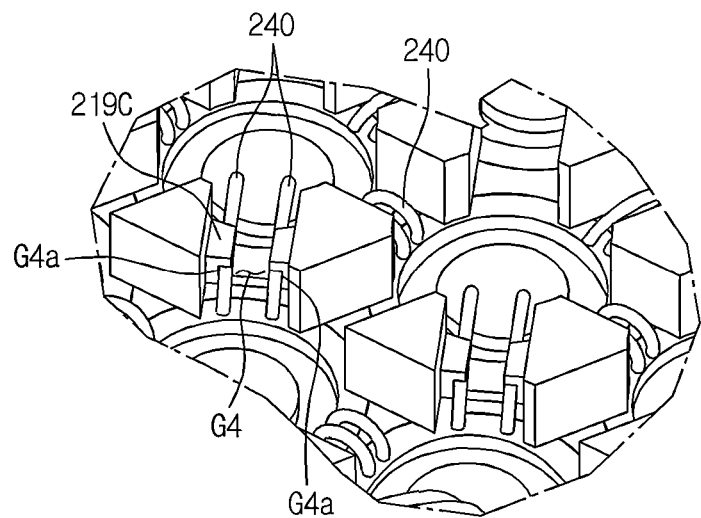
FIG. 12 is a partial enlarged view schematically showing partial components with respect to a battery module according to another embodiment of the present disclosure.

FIG. 12 is a partial enlarged view schematically showing partial components with respect to a battery module according to another embodiment of the present disclosure.

Referring to FIG. 12, a fixing groove G4 having a structure recessed in an inward direction may be formed on at least one of the top and the bottom of the partition wall 219. The fixing groove G4 may be recessed in a size for accommodating the outer shape of the wire type bus bar 240 such that a portion of the wire type bus bar 240 is inserted.

For example, as shown in FIG. 12, the fixing groove G4 recessed in a downward direction may be formed at the top of the partition wall 219. Also, an insertion portion G4a into which the wire type bus bar 240 may be inserted may be formed at each of both sides inside the fixing groove G4.

As such, according to such a configuration of the present disclosure, by fixing the wire type bus bar 240 in the fixing groove G4 formed at the partition wall 219C, it is possible to prevent occurrence of short circuit, caused by the situation that one end portion of the wire type bus bar 240 may move and contact the other electrode terminal 111 when the wire type bus bar 240 is disconnected from the electrode terminal 111.

Referring to FIG. 8 together with FIGS. 1 and 2 again, a plurality of plate type bus bars 260 may electrically contact and be connected respectively to the plurality of wire type bus bars 240. Also, the plate type bus bar 260 may eventually achieve electric connection to a module terminal 280 of FIG. 1 to be electrically connected to an external device. Accordingly, the plate type bus bar 260 may be configured to provide electric connection between the plurality of cylindrical battery cells 100 and the module terminal 280 of FIG. 1 inside the battery module 200.

Here, the plate type bus bar 260 may include an electric conductive material. For example, the electric conductive material may be copper, aluminum, nickel, or the like.

Moreover, the plurality of plate type bus bars 260 may be positioned at both sides of each of the upper case 210A and the lower case 210B in the left-and-right direction. In particular, the plurality of plate type bus bars 260 positioned at both sides of each of the upper case 210A and the lower case 210B may have different polarities. For example, as shown in FIG. 8, the electric polarity of the plate type bus bar 260 positioned at the left portion of the lower case 210B may be negative and the electric polarity of the plate type bus bar 260 positioned at the right portion may be positive.

Also, an insertion groove G3 recessed in an upward direction such that at least a region of the plate type bus bar 260 is inserted and accommodated therein may be formed at each of both side portions of the upper case 210A in the left-and-right direction. Moreover, the insertion groove G3 recessed in a downward direction such that at least a region of the plate type bus bar 260 is inserted and accommodated therein may be formed at each of both side portions of the lower case 210B in the left-and-right direction.

For example, as shown in FIGS. 2 and 5, the insertion groove G3 may be formed at each of both side portions of the upper case 210A, and the plate type bus bar 260 may be inserted and fixed to the insertion groove G3. Also, as shown in FIG. 8, the insertion groove G3 may be formed at each of both side portions of the lower case 210B, and the plate type bus bar 260 may be inserted and fixed to the insertion groove G3.

Figure 13:
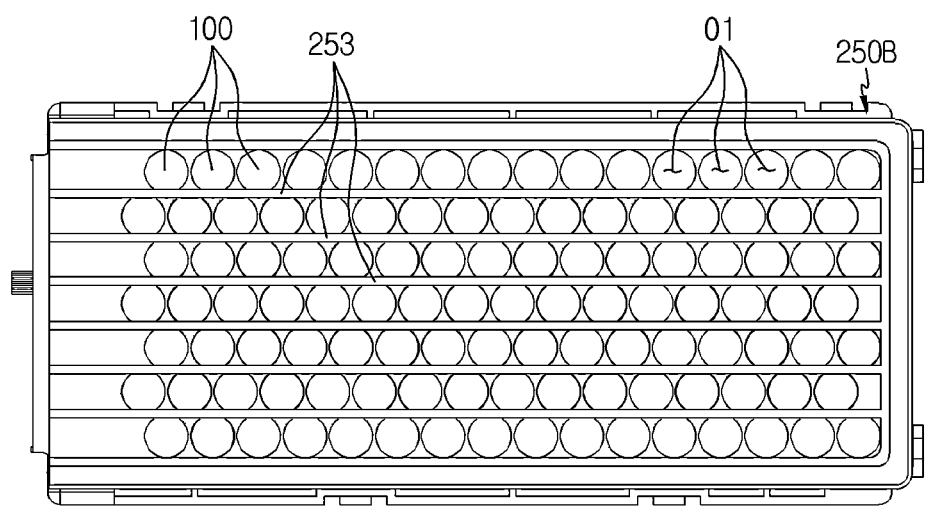
FIG. 13 is a plan view schematically showing a battery module according to an embodiment of the present disclosure.

FIG. 13 is a plan view schematically showing a battery module according to an embodiment of the present disclosure.

Referring to FIG. 13 together with FIG. 2 again, an upper support cover 250A where an accommodating space accommodating the top of the cylindrical battery cell 100 is formed may be combined to the top portion of the upper case 210A. In other words, the upper support cover 250A may include the accommodating space where a plurality of openings O1 perforated in circles are formed. Also, a support 253 supporting the upper surface of the cylindrical battery cell 100 may be formed at the top of the upper support cover 250A.

Moreover, a lower support cover 250B where an accommodating space accommodating the top of the cylindrical battery cell 100 is formed may be combined to the bottom portion of the lower case 210B. In other words, the lower support cover 250B may include the accommodating space where the plurality of openings O1 perforated in circles are formed. Also, the support 253 supporting the lower surface of the cylindrical battery cell 100 may be formed at the bottom of the lower support cover 250B.

For example, as shown in FIG. 2, the upper support cover 250A and the lower support cover 250B are provided respectively at the top and the bottom of the battery module 200. Also, the accommodating space for accommodating one region of the 112 cylindrical battery cells 100 may be provided at each of the upper support cover 250A and the lower support cover 250B. Also, the six supports 253 for supporting a cross section of the plurality of cylindrical battery cells 100 are provided at each of the upper support cover 250A and the lower support cover 250B.

Figure 14:
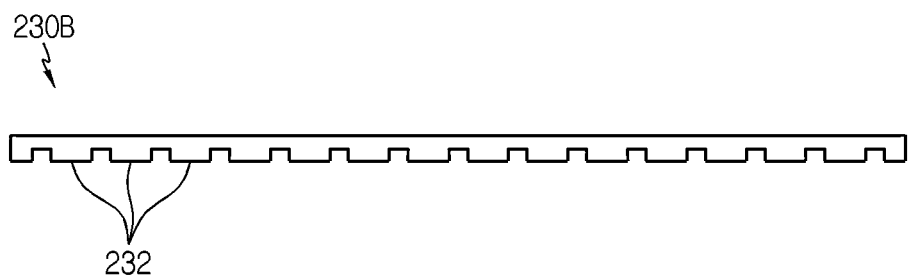
FIG. 14 is a side view schematically showing a cover sheet that is a partial component with respect to a battery module according to another embodiment of the present disclosure.

FIG. 14 is a side view schematically showing a cover sheet that is a partial component with respect to a battery module according to another embodiment of the present disclosure.

Referring to FIG. 14 together with FIG. 8, an uplift structure 232 protruding in the top-and-bottom direction may be formed at each of top and bottom surfaces of a cover sheet 230B. Also, the uplift structure 232 may be formed along the gas discharge path 212 such that at least a portion thereof is inserted into the open portion 212K of the gas discharge path 212. Also, an uplifted size of the uplift structure 232 may protrude such as not to largely interfere with the movement of gas in the gas discharge path 212. For example, as shown in FIG. 14, the 16 uplift structures 232 protruding in the up-and-down direction may be formed at each of the top and bottom surfaces of the cover sheet 230B.

Meanwhile, a battery pack (not shown) according to the present disclosure may include at least one battery module 200 according to the present disclosure. Also, the battery pack according to the present disclosure may further include, in addition to the battery module 200, a pack case for accommodating the battery module 200 and various devices for controlling charging and discharging of the battery module 200, such as a battery management system (BMS), a current sensor, a fuse, etc.

Also, the battery pack according to the present disclosure may be applied to a device, such as an energy storage device. In other words, the device according to the present disclosure may include the battery pack according to the present disclosure.

For example, the battery pack may be applied to an energy storage system that may be used as a power source during emergency. In other words, the energy storage system according to the present disclosure may include the battery pack according to the present disclosure and a control unit capable of controlling the operation of the battery pack.

Hereinafter, examples and experiment examples are provided to describe the present disclosure in detail, but the present disclosure is not limited by these examples and experiment examples. The examples according to the present disclosure may be modified into various other forms, and the scope of the present disclosure should not be construed as being limited to the examples described below. The examples of the present disclosure are provided to enable one of ordinary skill in the art to more fully understand the present disclosure.

Comparative Example 1

Figure 15:
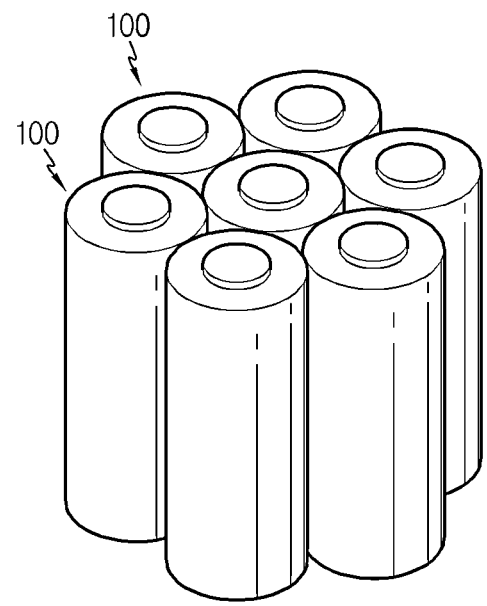
FIG. 15 is a perspective view schematically showing a configuration of Comparative Example 1 of the present disclosure.

The cylindrical battery cell 100 was manufactured by manufacturing a top cap and cylindrical case are manufactured by using nickel (Ni)-plated steel plate cold deep drawn extra (SPCE), mounting an electrode assembly inside the cylindrical case, performing a beading process on a region of the cylindrical case corresponding to a top portion of the electrode assembly to form a crimping region, inserting a gasket to an inner surface of the crimping region, and combining the top cap to the top of the cylindrical case. Then, as shown in FIG. 15, seven such cylindrical battery cells 100 were arranged such that side portions thereof in the horizontal direction contact each other without a space therebetween.

Example 1

The seven cylindrical battery cells 100 were manufactured in the same manner as in Comparative Example 1, except that the cylindrical battery cells 100 were spaced apart from each other by 0.1 mm in the horizontal direction.

Experiment Example 1: Chain Ignition Test

Products obtained in Comparative Example 1 and Example 1 were respectively put into two housings, a center battery cell located at the center among seven battery cells of each of Comparative Example 1 and Example 1 was arbitrarily ignited, and then the housings were sealed. Then, it was checked whether a chain ignition occurs in the remaining battery cell adjacent to the center battery cell.

As experiment results, the chain ignition occurred in the remaining battery cell adjacent to the center battery cell in Comparative Example 1, but the chain ignition did not occur in Example 1. It is determined that the chain ignition did not occur in Example 1 because the remaining battery cells are spaced from the ignited center battery cell by 0.1 mm and thus the amount of heat transferred from the ignited battery cell to the remaining battery cell is low compared to Comparative Example 1.

Example 2

Figure 16:
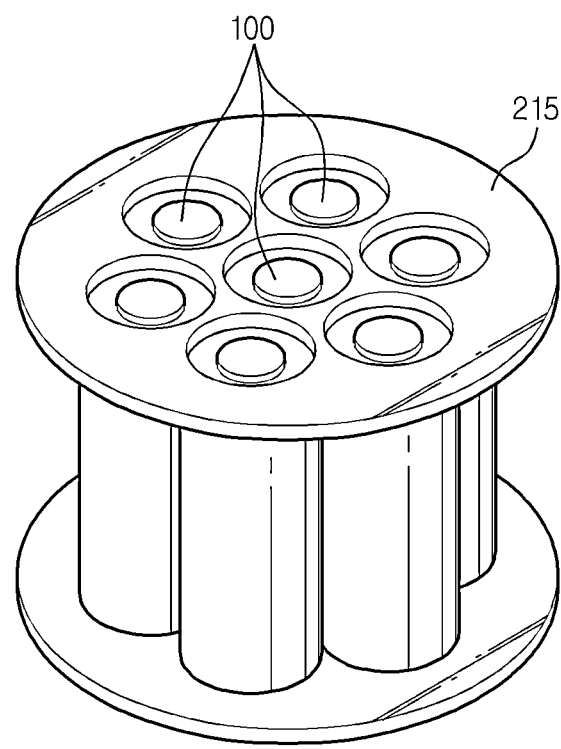
FIG. 16 is a perspective view schematically showing a configuration of Example 2 of the present disclosure.

As shown in FIG. 16, the seven cylindrical battery cells 100 manufactured in Comparative Example 1 were arranged to be spaced apart from each other by 0.1 mm, and an upper cover 215 adhesively surrounding the top of the cylindrical battery cell 100 was mounted on side portions of the seven cylindrical battery cells 100 in the horizontal direction such as to prevent flame from being introduced.

Comparative Example 2

The seven cylindrical battery cells 100 were configured in the same manner as Example 2, except that a separate member is not provided and the top portion of the cylindrical battery cells 100 in the horizontal direction is externally exposed.

Experiment Example 2: Chain Ignition Test

Products obtained in Comparative Example 2 and Example 2 were respectively put into two housings, a center battery cell located at the center among seven battery cells of each of Comparative Example 2 and Example 2 was arbitrarily ignited, and then the housings were sealed. Then, it was checked whether a chain ignition occurs in the remaining battery cell adjacent to the center battery cell.

As experiment results, the chain ignition occurred in the remaining battery cell adjacent to the center battery cell in Comparative Example 2, but the chain ignition did not occur in Example 2. It is determined that the chain ignition did not occur in Example 2 because radiant heat between the battery cells of Example 2 is low compared with Comparative Example 2 by reducing areas of the adjacent battery cells exposed to flame spread from the top of the ignited center battery cell, by using an upper cover.

Comparative Example 3

Figure 17:
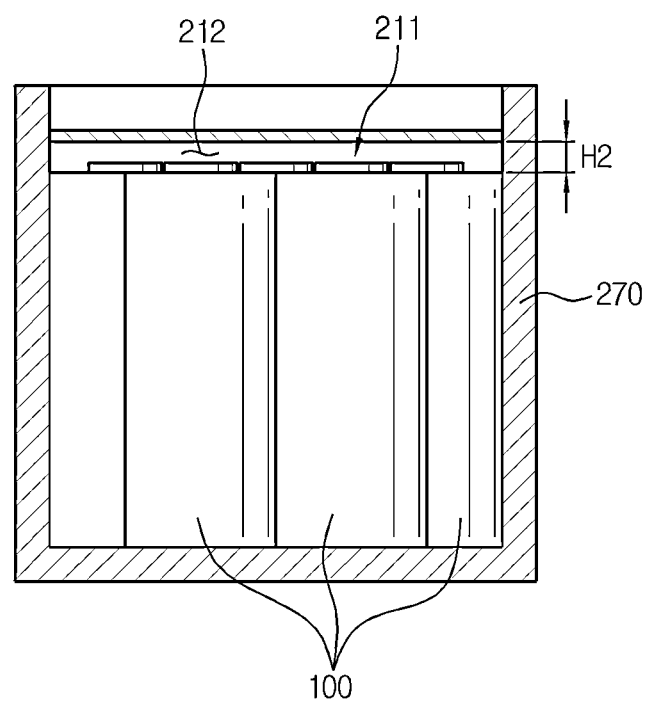
FIG. 17 is a cross-sectional view schematically showing a configuration of Comparative Example 3 of the present disclosure.

As shown in FIG. 17, in Comparative Example 3, a module case 270 where the gas discharge path 212 and the accommodating portion 211 accommodating the seven cylindrical battery cells 100 therein are formed was prepared. Here, a vertical height H2 of the gas discharge path 212 of the module case 270 was set to 4 mm.

Example 3

The module case 270 was prepared in the same manner as Comparative Example 3, except that the vertical height H2 of the gas discharge path 212 was set to 5 mm.

Experiment Example 2: Chain Ignition Test

A center battery cell located at the center among seven battery cells of each of Comparative Example 3 and Example 3 was arbitrarily ignited. Then, it was checked whether a chain ignition occurs in the remaining battery cell adjacent to the center battery cell.

As experiment results, the chain ignition occurred in the remaining battery cell adjacent to the center battery cell in Comparative Example 3, but the chain ignition did not occur in Example 3. It is determined that the chain ignition did not occur in Example 3 because, compared with Comparative Example 3, a time of the adjacent battery cells being exposed to flame and a gas of high temperature spread from the ignited center battery cell is reduced by forming the gas discharge path 212 higher to increase the capacity of instantaneously accommodating the flame or gas, and heat transferred between the battery cells via convection is reduced.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 100: cylindrical battery cell | 200: battery module |
| 111: electrode terminal | |
| 210A: upper case | 210B: lower case |
| 211: accommodating portion | |
| 212: gas discharge path | |
| 213: gas discharge hole | |
| 212K: open portion | |
| 219: partition wall | |
| 230: cover sheet | 232: uplift structure |
| 240: wire type bus bar | |
| G4: fixing groove | G1: hook protrusion |
| G2: coupling groove | G3: insertion groove |
| 217: stopper | |
| 250A: upper support cover | 250B: lower support cover |
| 260: plate type bus bar | |

INDUSTRIAL APPLICABILITY

The present disclosure relates to a battery module having a gas discharge structure and a battery pack including the battery module. Also, the present disclosure may be used for electric devices or vehicles, which require a power source.

What is claimed is:
1. A battery module comprising:
a plurality of cylindrical battery cells, each cylindrical battery cell having at least two electrode terminals of different polarities formed at one end portion thereof;
a case comprising an upper case and a lower case combined with the upper case to have a space in the case in which an accommodating portion is disposed to accommodate the plurality of cylindrical battery cells, the plurality of cylindrical battery cells including first battery cells in a first accommodation space in the upper case and second battery cells in a second accommodation space in the lower case; and a cover sheet between the upper case and the lower case configured to separate the first and second accommodation spaces such that the cover sheet is disposed between the first and second battery cells to separate the first and second battery cells; and a plurality of wire type bus bars configured to electrically contact and connect the electrode terminals of the plurality of cylindrical battery cells to each other, wherein the first accommodating space defines a first gas discharge path below the first battery cells and above the cover sheet extending in front, back, left, and right directions from an open portion below an end of each cylindrical battery cell of the first battery cells to externally discharge the gas discharged from the first battery cells to an outside of the battery module, wherein the second accommodating space defines a second gas discharge path above the second battery cells and below the cover sheet extending in front, back, left, and right directions from an open portion above an end of each cylindrical battery cell of the second battery cells to externally discharge the gas discharged from the second battery cells to an outside of the battery module, and wherein the plurality of cylindrical battery cells have a zigzag arrangement structure such that each row of the plurality of cylindrical battery cells are arranged in a line in a front-and-back direction with each alternate row being shifted in a forward direction or backward direction with respect to a reference line extending in a left-and-right direction, and wherein the first and second gas discharge paths include straightly connected portions extended in the front-and-back direction along an entire row of the plurality of cylindrical battery cells, the first gas discharge path is extended in a zigzag path in the left-and-right direction to connect the straightly connected portions of the first gas discharge path, and the second gas discharge path is extended in a zigzag path in the left-and-right direction to connect the straightly connected portions of the second gas discharge path such that a flame generated in the cylindrical battery cell is interfered by the side wall of the first and second gas discharge paths, and thus an influence of the flame on the left and right cylindrical battery cells adjacent to the ignited cylindrical battery cell is reduced.

2. The battery module of claim 1, wherein the first and second gas discharge paths include first and second discharge holes, respectively.

3. The battery module of claim 2, wherein a height of each of the first and second gas discharge paths in an up-and-down direction is at least 5 mm, and wherein the plurality of cylindrical battery cells are spaced apart from each other by at least 0.1 mm.

4. The battery module of claim 1, wherein the accommodating portion adhesively surrounds an outer surface of each of the plurality of cylindrical battery cells in a horizontal direction, and wherein the accommodating portion includes a plurality of stoppers disposed to extend from ends of the plurality of cylindrical battery cells to support at least one region of an upper surface or a lower surface of each of the plurality of cylindrical battery cells.

5. The battery module of claim 1, wherein the accommodating portion includes a plurality of partition walls in each of the upper case and the lower case.

6. The battery module of claim 5, wherein the partition walls have a stepped structure having different heights of an outer surface in an up-and-down direction.

7. The battery module of claim 5, wherein each partition wall has at least one inclined structure in which a vertical height continuously changes in a direction from one cylindrical battery cell to another cylindrical battery cell, and an upper end portion of each partition wall has a semicylindrical shape.

8. The battery module of claim 5, wherein at least one of an upper end and a lower end of each partition wall includes a fixing groove having a structure recessed in an inward direction such that a part of each of the plurality of wire type bus bars is inserted therein.

9. The battery module of claim 1, further comprising a plurality of plate type bus bars electrically contacting and connected to the plurality of wire type bus bars and positioned at both sides of each of the upper case and the lower case in a left-and-right direction, wherein an insertion groove recessed in an upward direction is at each of both side portions of the upper case in the left-and-right direction such that at least one region of the plurality of plate type bus bars is inserted and accommodated therein, and wherein an insertion groove recessed in a downward direction is at each of both side portions of the lower case in the left-and-right direction such that at least one region of the plurality of plate type bus bars is inserted and accommodated therein.

10. The battery module of claim 1, wherein the cover sheet comprises a mica material.

11. The battery module of claim 1, wherein the cover sheet includes an uplift structure having protrusions in an up-and-down direction along the first and second gas discharge paths on each of top and bottom surfaces of the cover sheet such that at least a portion of the uplift structure is inserted into an open portion of each of the first and second gas discharge paths.

12. A battery pack comprising at least one battery module according to claim 1.

13. A device comprising the battery pack of claim 12.

14. The battery module of claim 2, wherein each of the first and second gas discharging paths extends in front, back, left, and right directions from each open portion to form an interconnected web of paths providing multiple paths to the discharge holes.

15. The battery module of claim 14, wherein the first gas discharge hole includes a plurality of gas discharging holes connected to the first gas discharging path, wherein the second gas discharge hole includes a plurality of gas discharging holes connected to the second gas discharging path.

16. The battery module of claim 1, wherein, in the plurality of wire type bus bars, an electrical connection between two electrode terminals of neighboring ones of the cylindrical battery cells includes two more wire type bus bars such that electrical resistance is reduced and electrical connection reliability is increased.

* * * * *